United States Patent [19]

Box

[11] Patent Number: 4,998,967
[45] Date of Patent: Mar. 12, 1991

[54] POULTRY DRAWER

[75] Inventor: Thomas Box, Shrewsbury, N.J.

[73] Assignee: Spectrum International, Inc., Shrewsbury, N.J.

[21] Appl. No.: 411,711

[22] Filed: Sep. 25, 1989

[51] Int. Cl.⁵ .............................................. A01K 31/07
[52] U.S. Cl. .................................... 119/22; 220/4.03; 206/509
[58] Field of Search .................................. 119/19, 22; 220/DIG. 15, 4A, 72; 206/509

[56] References Cited

U.S. PATENT DOCUMENTS

| | | | |
|---|---|---|---|
| 3,283,915 | 11/1966 | Maslow | 206/509 X |
| 3,777,710 | 12/1973 | Rhinehart | 119/19 X |
| 3,930,467 | 1/1976 | Fier, Jr. | 119/19 |
| 3,998,328 | 12/1976 | Box | 220/72 X |
| 4,273,071 | 6/1981 | Clark et al. | 119/17 |
| 4,342,393 | 8/1982 | Box | 119/19 X |
| 4,365,591 | 12/1982 | Wills et al. | 119/22 X |
| 4,723,679 | 2/1988 | Sinchok et al. | 220/4 A |
| 4,760,921 | 8/1988 | Licari | 206/509 X |

FOREIGN PATENT DOCUMENTS

| | | | |
|---|---|---|---|
| A094470 | 7/1969 | France | 206/509 |
| 0951891 | 3/1964 | United Kingdom | 220/DIG. 15 |
| 2129672B | 5/1984 | United Kingdom . | |
| 2205474A | 12/1988 | United Kingdom . | |

OTHER PUBLICATIONS

Anglia Autoflow Limited, "AA Easyload" (refers to U.S. Pat. Nos. 4,273,071 and 4,365,591 above).

Primary Examiner—Robert P. Swiatek
Assistant Examiner—Todd E. Manahan
Attorney, Agent, or Firm—Hedman, Gibson, Costigan & Hoare

[57] ABSTRACT

A poultry drawer for the transportation of live poultry is formed from molded plastic having two longitudinal sides and two lateral sides each surrounded by a rib structure, four hollow corners having a closed upper surface and open lower surface and a bottom supported by a structural reinforcement member. A one-piece extension, having continuous upper and lower flange surfaces is designed to be used with the drawer to accommodate larger poultry by releasable engagement of detents on the extension which engage holes on the upper portion of the sides of the drawer.

2 Claims, 5 Drawing Sheets

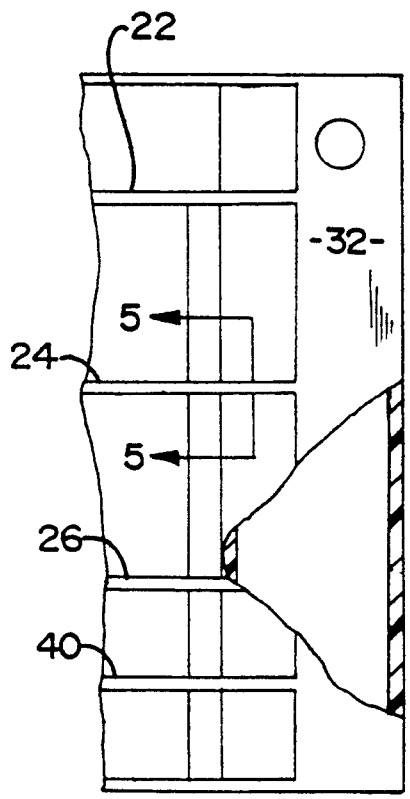
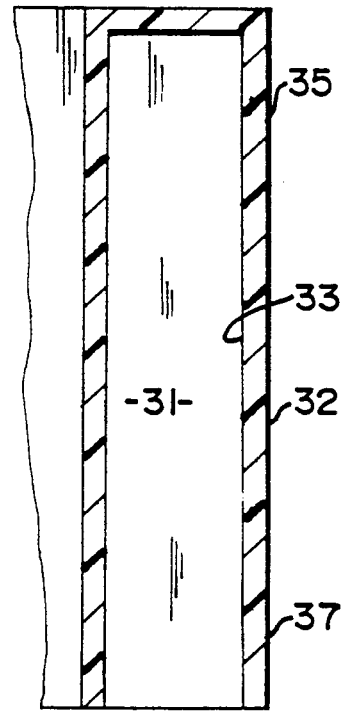
FIG. 4  FIG. 4A
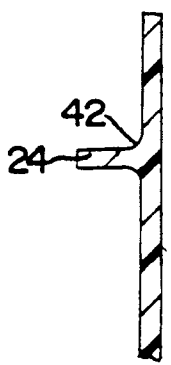
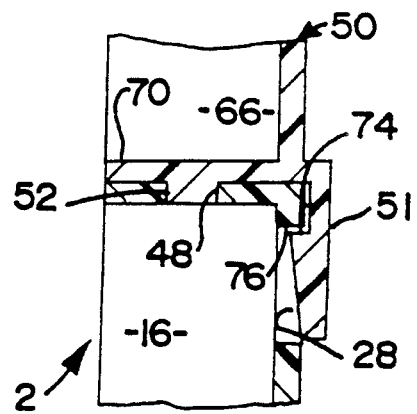
FIG. 5  FIG. 7

POULTRY DRAWER

FIELD OF THE INVENTION

The present invention relates to poultry transport systems and, in particular, a poultry drawer for the transport of live chicken and turkey.

BACKGROUND OF THE INVENTION

Poultry has been handled for many years by transporting live birds to processing facilities. Originally, transportable chicken coops were provided that were typically formed of wire or wooden lattice construction throughout with heavy wood rectangular frames. It has always been necessary for poultry transportation devices to have maximum ventilation and sufficient structural rigidity to accommodate the weight of the live animals in the coops or crates and also to withstand the heavy duty movement of the articles over conveyer belts, on trucks, etc. Originally, the devices were, in effect, transportable coops having self-contained individual coops that could be stacked one above the other during transportation.

Eventually, heavy duty poultry transport coops were formed of plastic structures consisting of a light weight and high impact synthetic plastic material, such as polyethylene or polypropylene. Again, the coops were comprised essentially of a plurality of sidewalls joined to generally planar upper ceiling and lower floor structures to define a full enclosure for the poultry. Again, it was necessary to provide doors or hinged lids to enable access to the interior of the coops for loading and unloading the poultry.

More recently, module systems have been provided wherein the modules are comprised of a plurality of cavities, i.e. twelve to fifteen. Discrete drawers are provided for each of the compartments or cavities of the module. With this design, the top that was necessary in the chicken coop to provide a fully contained structure is omitted. The module sections serve to form a surface on which the drawers can be seated and the bottom of one surface also serves as a top to confine the birds in the drawers.

Poultry transport involves the transportation of various sized birds. In particular, a drawer adapted to transport a turkey must be higher than the drawer required to transport a chicken. Typically, six to eight birds are placed in each drawer.

The use of drawers as distinct from coops by its nature provides a less durable structure. The coops are fully confined articles having a structural integrity upon all six sides. Conversely, the drawer having an open top has only structural support of the four sides and the bottom. As a result, the heavy duty handling of drawers presently in use has led to a relatively short useful life of each drawer.

In addition, the various sized birds that must be transported in drawers has resulted in dedication of a particular size drawer to a particular bird. The drawers designed to accommodate chickens will necessarily be one size and the drawers designed to transport and store turkeys will be another size.

Further, the drawers now in use, whether for the transport of chicken or turkey, are subjected to a considerable variety of transport situations. The drawers must be capable of being transported over land in a truck or other moving vehicle with a plurality of other drawers, usually in a module. In addition, the drawers must be capable of individual movement, usually over a conveyer system from the arrival at the processing site to the actual processing assembly line.

SUMMARY OF THE INVENTION

It is an object of the present invention to provide a molded plastic drawer for poultry capable of withstanding the rigors of transport and storage of poultry.

It is a further object of the present invention to provide a transportable poultry storage drawer capable of being converted from a chicken to a turkey drawer.

In accordance with the present invention, there is provided a molded plastic drawer having a rib structure on the two lateral and the two longitudinal sides which afford both ventilation to the interior of the drawer and structural rigidity. The drawer structure is also provided with a floor arranged above a bottom structural frame member.

In addition, the drawer of the present invention is provided with an extension having the same length and width dimensions that fits on the upper surface of the poultry drawer to provide an enlarged drawer adapted to accommodate larger birds such as turkeys.

DESCRIPTION OF THE DRAWINGS

The preferred embodiment of the present invention will be better understood when viewed with the following drawings wherein:

FIG. 4 is an elevational view taken through line 4—4 of FIG. 1;

FIG. 4A is a sectional elevational view of the corner 32;

FIG. 5 is an enlarged detail elevational view taken through line 5—5 of FIG. 4;

FIG. 7 is a sectional elevational view showing the drawer latching assembly taken through line 7—7 of FIG. 6.

DESCRIPTION OF THE PREFERRED EMBODIMENT

The preferred embodiment of the present invention is a poultry drawer 2 designed to accommodate chickens and having the capacity to be enlarged in size to also accommodate turkeys.

Figure 1:
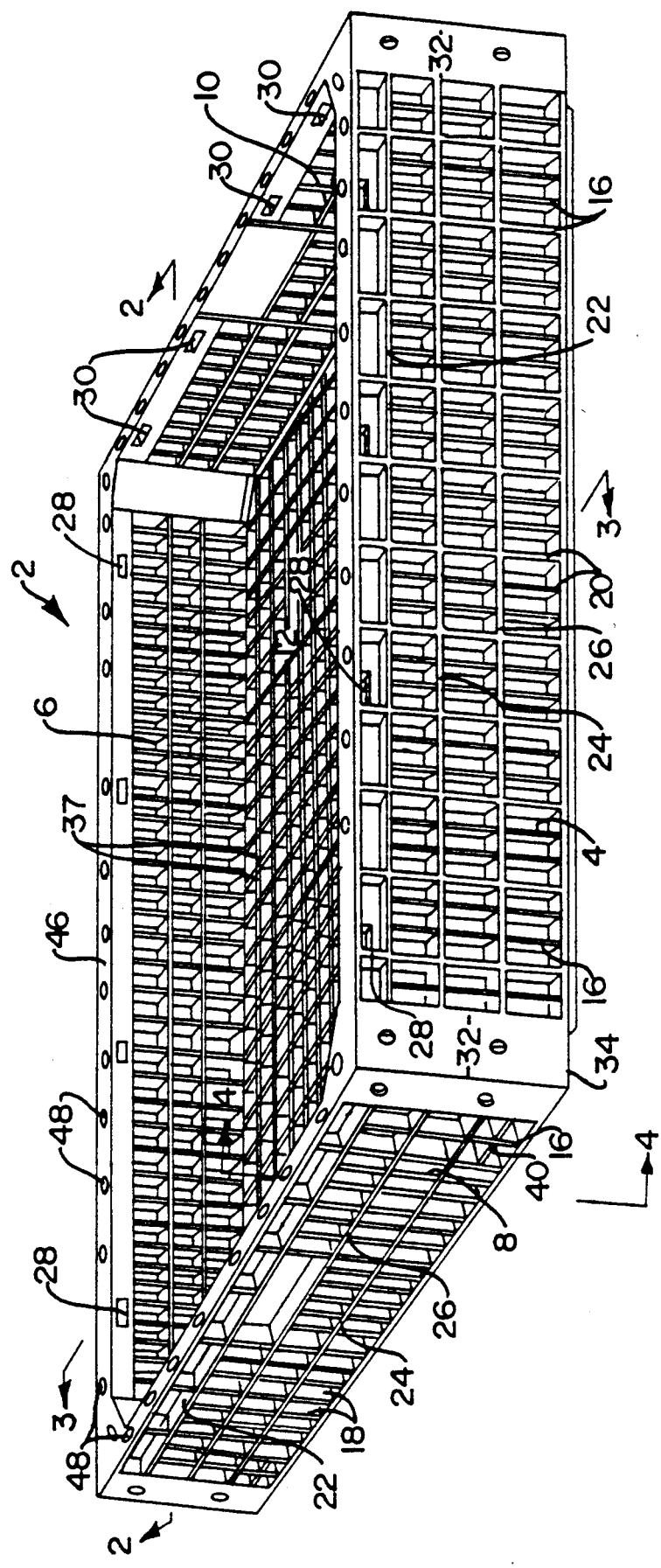
FIG. 1 is a perspective view of the poultry drawer of the present invention.

As best seen in FIG. 1, the drawer 2 is provided with longitudinal sides 4 and 6 and lateral sides 8 and 10. The drawer 2 is provided with a floor 12 that rests on and is accommodated with a bottom structural ribbed structure of ribs 14.

Figure 2:
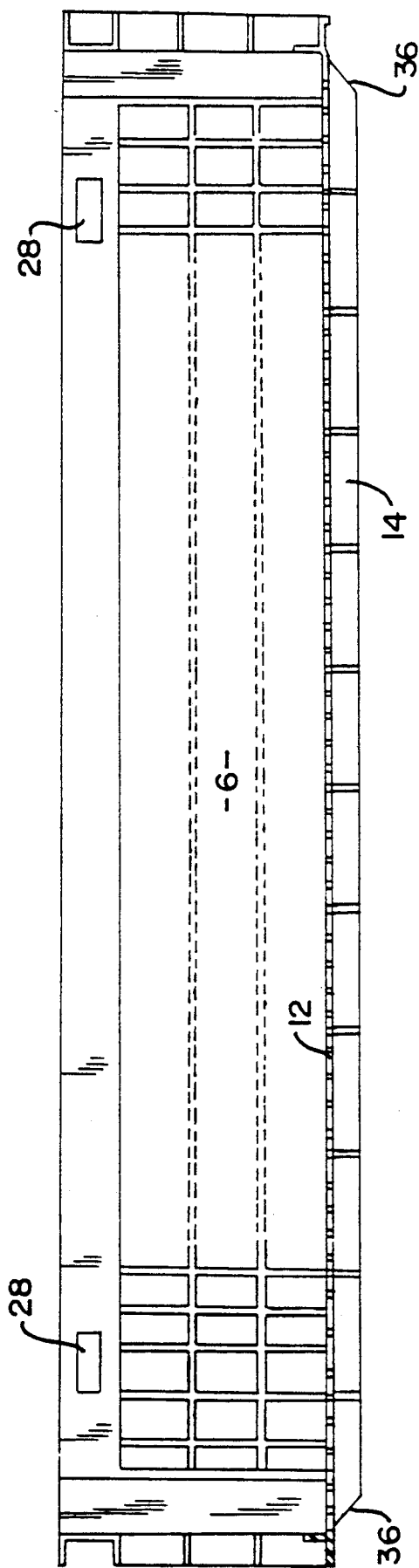
FIG. 2 is a sectional elevational view taken through line 2—2 of FIG. 1.
Figure 2A:
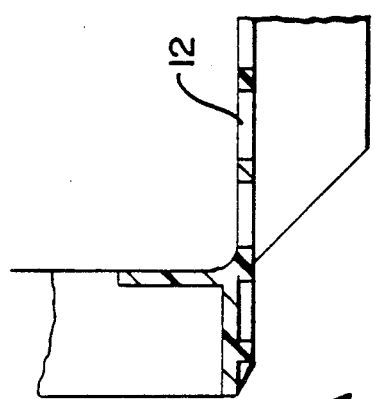
FIG. 2A is an enlarged detail drawing of a portion of FIG. 2.

The structure of the drawer 2 is provided with a girdle or rib assembly 16 that is integrally formed around the four longitudinal sides and lateral sides. The rib assembly 16 is comprised of a plurality of ribs 18 that extend vertically on the lateral sides 8 and 10, a plurality of ribs 20 that extend vertically on the longitudinal sides 4 and 6. The interior of the rib surface is the inner surface of the drawer 2 in which openings between each of the ribs are formed to provide the maximum of ventilation for the structure. The girdle or rib structure 16 is also provided with a plurality, in this case three (3) horizontal ribs 22, 24 and 26 that extend around the longitudinal sides 4 and 6 and the lateral sides 8 and 10 to effectively form continuous ribs. The floor 12 is elevated by a plurality of parallel ribs 14, best seen in FIG. 2, that extend from the longitudinal side 4 to the longitudinal side 6. The ribs 14 are bevelled at each end with bevels 36. Holes 37 are provided in the floor 12.

The structure of the drawer 2 also includes four corner members 32 that are hollow and can be accessed through an opening 34 in the bottom. The hollow sides of the structure are provided to facilitate conveyer handling of the drawer 2. In practice, the drawers 2 will be unloaded from a module onto a conveyer, normally by a pusher mechanism and thereafter will be reoriented by a post mechanism (not shown) that accesses the opening 34 provided in the bottom of the corner members 32 to reorient the drawer 2 from a transverse to a longitudinal orientation on a conveyer belt (not shown).

Figure 3:
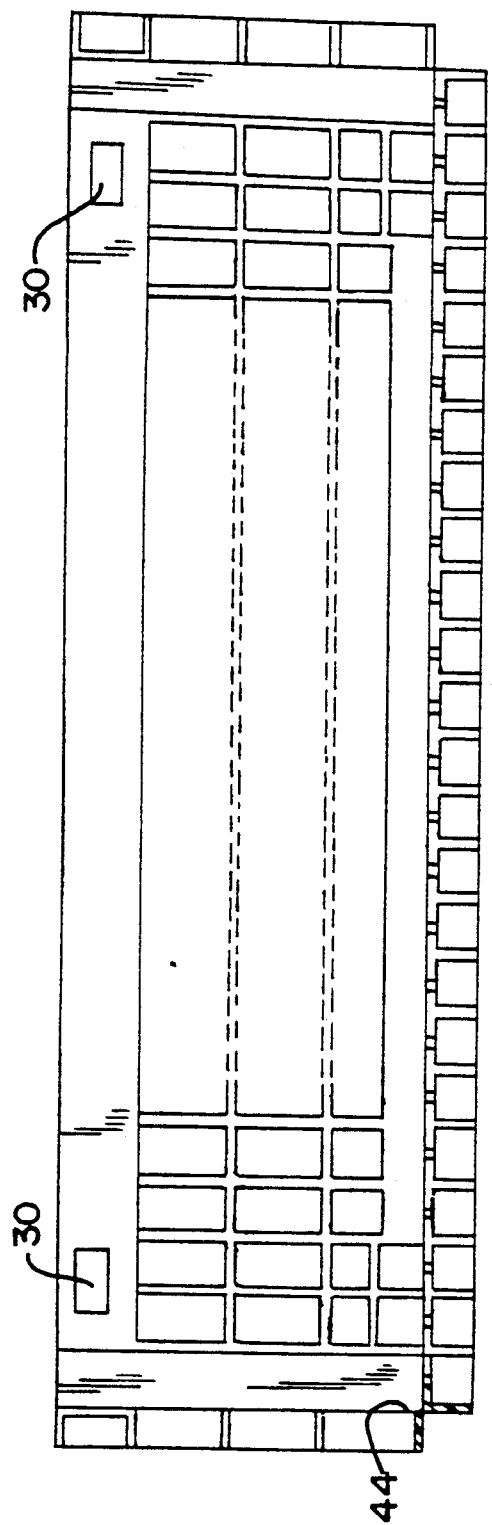
FIG. 3 is a sectional elevational view taken through line 3—3 of FIG. 1.
Figure 3A:
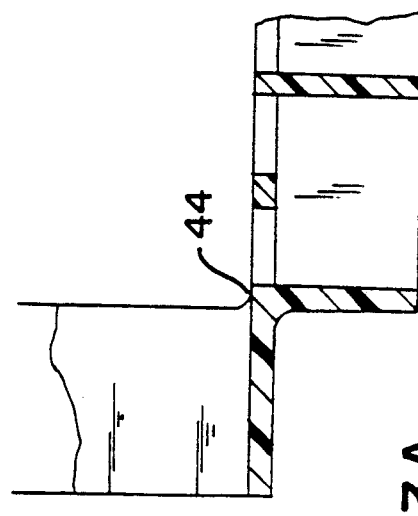
FIG. 3A is an enlarged detail drawing of a portion of FIG. 3.

The structure of the present invention is provided with a reinforcement rib 40 located intermediate the bottom of the drawer 2 and the lower most horizontal continuous rib 26. The ribs 40 which extend from the corner to the adjacent vertical rib on each side provide structural integrity to the corner member 32 required for heavy duty conveyer handling of the article. In addition, the ribs 24 are provided with reinforced radii 42 that extend along the surface of the rib 40, best seen in FIGS. 4 and 5. In practice, each radii 42 has a radius one-quarter to one-half inch. Each vertical rib is also provided with reinforced radius 44, best seen in FIGS. 3 and 3A, at the connection to the floor member 12. The reinforced radius 44 has a radius of one-quarter to one-half inch.

The drawer 2 is also provided with four openings 28 on each longitudinal side and four openings 30 on each lateral side. Each surface of the upper flange surface 46 of the drawer 2 is provided with strategically located holes 48.

The corner member 32 forms a channel 31 defined by a circular wall 33 best seen in FIG. 4A. The circular wall 33 is reinforced with an increased wall thickness 35 at the top which is greater than the lower wall 37.

The drawer 2 also includes a height extension 50 (seen in FIG. 6 attached to the drawer 2) for connection to the drawer 2. The height extension 50 is comprised of two longitudinal sides 54 and 56 and two lateral sides 58 and 60 that form a continuous upper flange surface 68 and a continuous bottom flange surface 70. A rib structure 62 comprised of continuous horizontal ribs 64 and a plurality of vertical ribs 66 that extend between the upper flange surface 68 and the lower flange surface 70 is provided. The vertical ribs 66 are aligned with the vertical ribs 18 and 20 of the drawer 2. Openings 72 exist between the horizontal ribs 64 and the vertical ribs 66 to provide a maximum of ventilation.

The height extension 50 is provided with pins 52, best seen in FIG. 7, that depend downwardly from the bottom flange surface 70 of the extension 50 that are strategically aligned with each hole 48 in the upper flange surface 46 of the drawer 2.

The height extension 50 is also provided with four detents 51, best seen in FIG. 7, projecting downwardly from each longitudinal wall 54 and 56 and each lateral wall 58 and 60. The detents 51 depend downwardly and are aligned with each of the openings 28 and 30 in the walls of the drawer 2. The detents 51 are formed with inwardly extending lips 74 that snap into the openings 28 and 30 in the drawer 2.

The extension 50 is connected to the drawer 2 by aligning the pins 52 that extend downwardly from the bottom flange surface 70 with the holes 48 in the upper flange surface 46 of the drawer 2. The four detents 51 on each longitudinal wall 54, 56 and each lateral wall 58, 60 of the extension 50 aligned with the openings 28 and 30 in the drawer are then snapped into the openings 28 and 30 with the lip 74 of each detent 51 bearing against the upper surface 76 of each opening in the walls of the drawer 2 to fix the extension 50 to the drawer 2.

Figure 6:
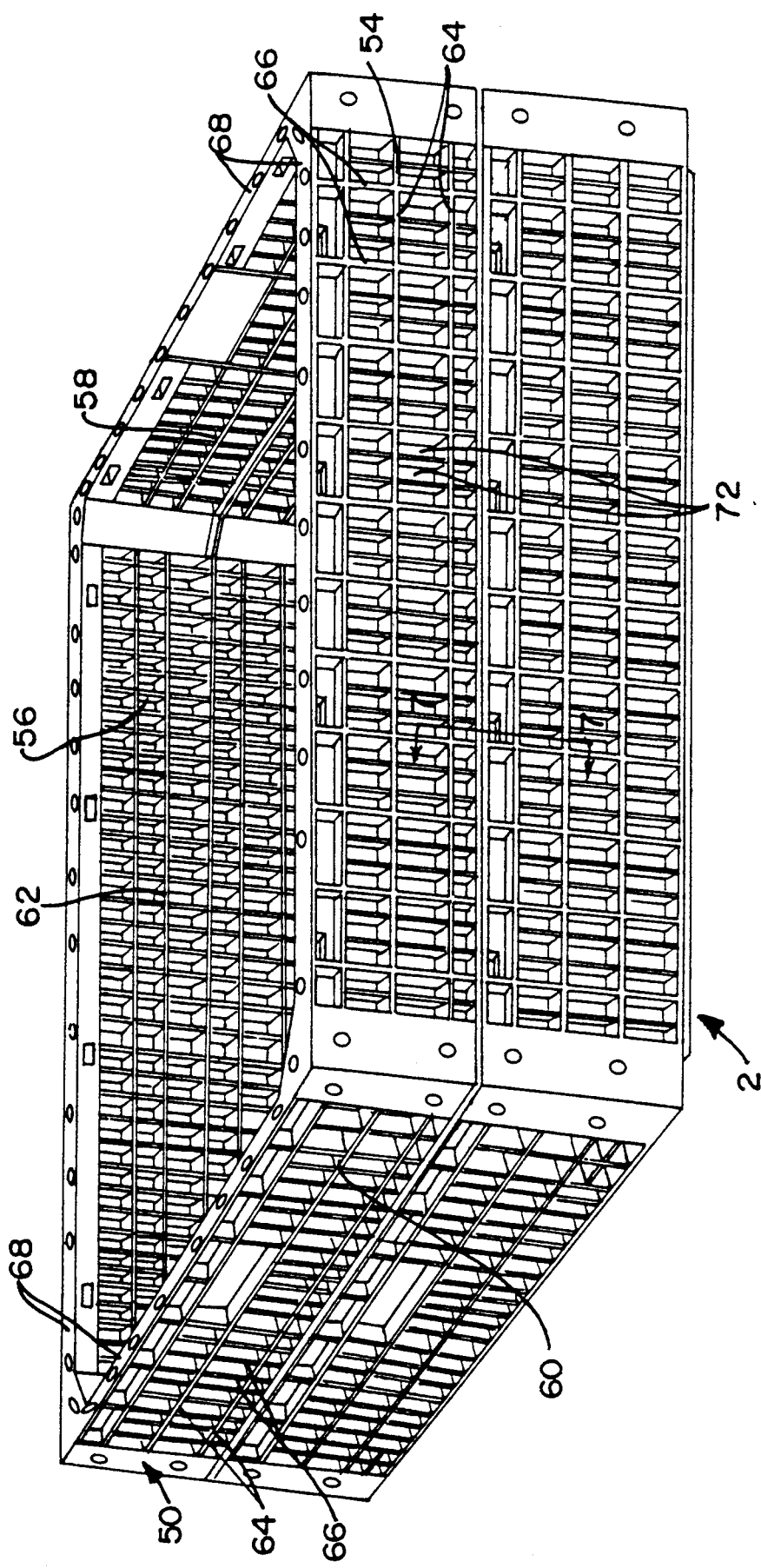
FIG. 6 is a perspective view of the drawer of FIG. 1 shown in its assembled condition to accommodate a larger bird such as the turkey.

As best seen in FIG. 6, the drawer 2 is converted to a large bird or turkey drawer by the connection of the extension 50 to the base member 2.

In practice, the drawer of the present invention is sized with longitudinal sides of about 30 inches and lateral sides of about 40 inches. Eleven vertical ribs are arranged on each longitudinal side and six ribs are arranged on each lateral side. The ribs are one inch and a quarter thick and a width of three-eighths of an inch. The drawer 2 is seven and five-eighths inches high and the extension 50 is six and three-eighths inches high. Thus, when the composite assembly is configured in the large bird embodiment, the overall height is fourteen inches.

I claim:
1. A poultry drawer comprised of
   (a) two longitudinal sides;
   (b) two lateral sides;
   (c) a rib structure surrounding the longitudinal and lateral sides;
   (d) a bottom;
   (e) a structural reinforcement member supporting the bottom; and
   (f) a one-piece height extension comprising continuous upper and continuous lower flange surfaces.
2. A poultry drawer as in claim 1 further comprising holes on the upper surface of the poultry drawer and strategically located openings in the sides of the poultry drawer; and said height extension having detents depending downwardly at strategically located positions and pin members located strategically at positions in alignment with the holes in the upper surface of the poultry drawer.

* * * * *